UNITED STATES PATENT OFFICE.

AUGUST LEOPOLD LASKA AND ARTHUR ZITSCHER, OF OFFENBACH-ON-THE-MAIN, GERMANY, ASSIGNORS TO CHEMISCHE FABRIK GRIESHEIM-ELEKTRON, OF FRANKFORT-ON-THE-MAIN, GERMANY.

AZO DYES FROM THE ARYLAMIDS OF 2.3-OXYNAPHTHOIC ACID AND PROCESS OF MAKING THEM.

1,121,026.   Specification of Letters Patent.   Patented Dec. 15, 1914.

No Drawing.   Application filed May 11, 1914. Serial No. 837,649.

*To all whom it may concern:*

Be it known that we, AUGUST LEOPOLD LASKA and ARTHUR ZITSCHER, citizens of the German Empire, and residents of Offenbach-on-the-Main, in the Grand Duchy of Hesse, Germany, have invented new and useful Improvements in Azo Dyes from the Arylamids of 2.3-Oxynaphthoic Acid and Processes of Making Them, of which the following is a specification.

Our invention relates to the production of azo dyestuffs consisting in combining the diazo compounds of the anthraquinone series with the arylamids of 2:3-oxynaphthoic acid. Under the term "diazo compound" we include the diazo and tetrazo derivatives.

The new dyestuffs, having probably the formula:

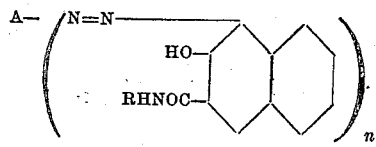

wherein A means the residue of a compound of the anthraquinone series, R an aromatic radical and $n$ a number less than three are, when dry, red to dark red powders, soluble in concentrated sulfuric acid to a greenish blue to violet solution and precipitatable by water in red to dark red flakes; they may be used for the production of color lakes, yielding red lakes which are fast to oil even if there are no negative radicals in the residue of the arylamid; they may also be produced on the fiber; they are distinguished from the corresponding β-naphthol combinations (see also the German Letters Patent No. 261872) by their better fastness to light and to boiling with soap, apart from the fact that the β-naphthol combinations yield color lakes soluble in oil.

The following examples illustrate the invention, the parts being by weight.

Example 1.

A diazo solution, prepared in the usual manner from 22.3 parts of 2-amino-anthraquinone, is poured at low temperature into a solution of 27 parts of the anilid of 2:3-oxynaphthoic acid in diluted caustic soda lye, mixed with such a quantity of soda, that the mixture shows neutral reaction at the end of the combination. When the combination is complete the dyestuff is filtered off, well washed and preferably used in form of a paste. When dry, it is a brilliant red powder, soluble in concentrated sulfuric acid to a greenish blue solution. By pouring the solution in sulfuric acid into water the dyestuff is precipitated in brilliant red flakes.

When converted into lakes, the dyestuff yields yellowish red pigment colors of an excellent fastness to oil and light.

*Production of the dyestuff on the fiber.*— The cotton goods are impregnated in the well known manner with the following solution: 12 grams of anilid of 2:3-oxynaphthoic acid, 20 ccm. of caustic soda lye 34° Bé. and 25 grams of ricinoleate of soda are mixed to a paste and dissolved in 500 ccm. of boiling water, and the whole made up to 1 liter.

The well impregnated cotton goods are wrung out to about 50 p. c. and then dyed in the following dye-bath: A diazo solution, prepared from 22.3 parts of 2-aminoanthraquinone, is made up with cold water to 1 liter and mixed with 120 ccm. of a solution of sodium acetate (1:1). Then it is washed, soaped and washed once more. In this manner beautiful yellowish red tints of an excellent fastness to soap and light are obtained.

Example 2.

22.3 parts of 1-aminoanthraquinone are diazotized in the usual manner and combined with 27 parts of the anilid of 2:3-oxynaphthoic acid in alkaline solution after addition of Turkey red oil. The dyestuff, thus formed, is filtered off, washed and ground to a paste. When dry, it forms a dark red powder, soluble in concentrated sulfuric acid to a dark violet solution.

When converted into lakes the dyestuff yields red pigment colors of an excellent fastness to oil and light.

*Production of the dyestuff on the fiber.*— The goods are impregnated with a solution of the anilid of 2:3-oxynaphthoic acid, as described in Example 1, and dyed in the following dye-bath: A diazo solution, prepared from 22.3 parts of 1-amino-anthraquinone, is made up with cold water to 1 liter and mixed with 120 ccm. of a solution of sodium acetate (1:1). In this manner brilliant red tints, also of an excellent fastness to soap and light are obtained.

*Example 3.*

A tetrazo solution, prepared from 23.8 parts of 1:5-diaminoanthraquinone, is poured into an alkaline solution of 54 parts of the anilid of 2:3-oxynaphthoic acid, mixed with such a quantity of soda, that the mixture shows neutral reaction. When the combination is complete, the dyestuff is filtered, well washed and preferably used in form of a paste. When dry, it is a bluish dark red powder, soluble in concentrated sulfuric acid to a brown violet solution. By pouring this solution into water the dyestuff is separated in dark red flakes. On the production of lakes the dyestuff yields bluish red pigment colors of an excellent fastness to oil and light.

*Production of the dyestuff on the fiber.*—
The goods are impregnated with a solution of the anilid of 2:3-oxynaphthoic acid in a manner corresponding with Example 1 and dyed in the following dye-bath: A tetrazo solution, prepared from 23.8 parts of 1:5-diaminoanthraquinone, is made up with cold water to 1 liter and mixed with 120 ccm. of a solution of sodium acetate (1:1). In this manner deep bluish red tints also of an excellent fastness to soap and light are obtained. In like manner the combination is conducted with other diazo or tetrazo compounds of the anthraquinone series.

Instead of the anilid of 2:3-oxynaphthoic acid its homologues as the toluidids or its substitution products as the chloro- or nitro-anilids can be used.

Now what we claim and desire to secure by Letters Patent is the following:

1. As new articles the azo dyestuffs, which may be obtained by combining the diazo compounds of the anthraquinone series with the arylamids of 2:3-oxynaphthoic acid, which dyestuffs have probably the formula

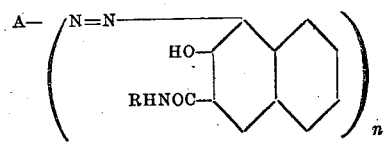

wherein A means the residue of a compound of the anthraquinone series, R an aromatic radical and $n$ a number less than three, which dyestuffs are, when dry, red to dark red powders, soluble in concentrated sulfuric acid to a greenish blue to violet solution and precipitatable with water in red to dark red flakes, and are adapted to yield when converted into lakes red to dark red pigment colors of an excellent fastness to oil and light.

2. Process of making azo dyestuffs consisting in combining the diazo compounds of the anthraquinone series with the arylamids of 2:3-oxynaphthoic acid.

3. Process of making azo dyestuffs on the vegetable fiber consisting in impregnating the vegetable fiber with the solution of an arylamid of 2:3-oxynaphthoic acid and treating them with a diazo compound of the anthraquinone series.

That we claim the foregoing as our invention we have signed our names in presence of two witnesses, this twenty-second day of April, 1914.

AUGUST LEOPOLD LASKA.
ARTHUR ZITSCHER.

Witnesses:
PETER LAUTENSCHLÄGER,
FRITZ DÉSOR.